(12) United States Patent
Histrov et al.

(10) Patent No.: US 7,332,723 B2
(45) Date of Patent: Feb. 19, 2008

(54) VARIABLE GAIN IMAGING

(75) Inventors: Dimitre Histrov Histrov, Pleasant Hill, CA (US); Zirao Zheng, Santa Rosa, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 367 days.

(21) Appl. No.: 10/726,449

(22) Filed: Dec. 2, 2003

(65) Prior Publication Data

US 2005/0116173 A1 Jun. 2, 2005

(51) Int. Cl.
*G01T 1/20* (2006.01)

(52) U.S. Cl. ...................................................... 250/368

(58) Field of Classification Search ................. 250/368
See application file for complete search history.

(56) References Cited

U.S. PATENT DOCUMENTS

| 4,205,231 | A | * | 5/1980 | Pochwalski ................. 250/364 |
| 4,852,131 | A | * | 7/1989 | Armistead ..................... 378/4 |
| 5,003,572 | A | * | 3/1991 | Meccariello et al. ....... 378/98.7 |
| 5,616,924 | A | * | 4/1997 | Petrillo ....................... 250/368 |

\* cited by examiner

*Primary Examiner*—David Porta
*Assistant Examiner*—Shun Lee

(57) ABSTRACT

An apparatus may include a scintillator to emit light, imaging elements to capture image information based on received light, and an optical filter disposed between the scintillator and the imaging elements, wherein an opacity of the optical filter is controllable.

18 Claims, 5 Drawing Sheets

VARIABLE GAIN IMAGING

BACKGROUND

1. Field

The present invention relates generally to the control of light incident to imaging devices, and may be applied, for example, to portal imaging in conjunction with radiation therapy.

2. Description

Many types of conventional imaging devices create image data based on light incident thereto. Known charge-coupled devices and amorphous silicon devices convert incident light to stored electrical charge. For example, a photodiode of an amorphous silicon imaging device accumulates electrical charge in proportion to an intensity of received light. After a specified time period, the accumulated charge is read in order to calculate the intensity of light received by the photodiode.

It may be desirable to operate an imaging device within a particular range of light intensities. This particular operating range is often associated with a maximum signal-to-noise ratio of the imaging elements of the imaging device. More particularly, the imaging elements of an imaging device may most accurately detect differences in the intensities of incident light in a case that the intensities fall within the particular operating range.

An imaging device may be susceptible to saturation. Saturation describes a situation in which one or more imaging elements of the imaging device is unable to respond to additional incident light. With respect to the aforementioned charge-coupled devices and amorphous silicon devices, saturation exists in a case that an imaging element cannot store additional electrical charge even if the imaging element receives additional light. An imaging device cannot accurately detect relative differences in the intensity of light incident to various imaging elements of the imaging device if one or more of the various imaging elements are saturated.

An imaging device may be designed and/or calibrated to perform an imaging task in view of the foregoing considerations. This design/calibration attempts to ensure that light intensities associated with the imaging task fall within a high signal-to-noise operating range of the imaging device and would not cause any imaging elements to saturate. However, various imaging tasks may present conflicting ranges of light intensities. As a result, an imaging device that is designed and/or calibrated for a first imaging task may experience a low signal-to-noise ratio and/or saturation if used for a second imaging task.

SUMMARY

To address at least the above problems, some embodiments of the present invention provide a system, method, apparatus, and means to determine a radiation dose, and to control an amount of light to be received by imaging elements based on the determined dose. In some embodiments, controlling the amount of light includes control of the opacity of an optical filter disposed between a scintillator and the imaging elements. Controlling the amount of light according to some embodiments includes moving an optical filter to a position between a scintillator and the imaging elements.

Some aspects provide a scintillator to emit light and imaging elements to capture image information based on received light. An optical filter is disposed between the scintillator and the imaging elements, and an opacity of the optical filter is controllable.

In some aspects, provided are a scintillator to emit light, imaging elements to capture image information based on received light, and an optical filter. The optical filter is controllably movable from a first position between the scintillator and the imaging elements, and a second position not between the scintillator and the imaging elements.

The claims are not limited to the disclosed embodiments, as those skilled in the art can readily adapt the teachings of the present application to create other embodiments.

DETAILED DESCRIPTION

The following description is provided to enable any person skilled in the art to make and use the embodiments described herein and sets forth the best mode contemplated by the inventors. Various modifications, however, will remain readily apparent to those in the art.

Figure 1:
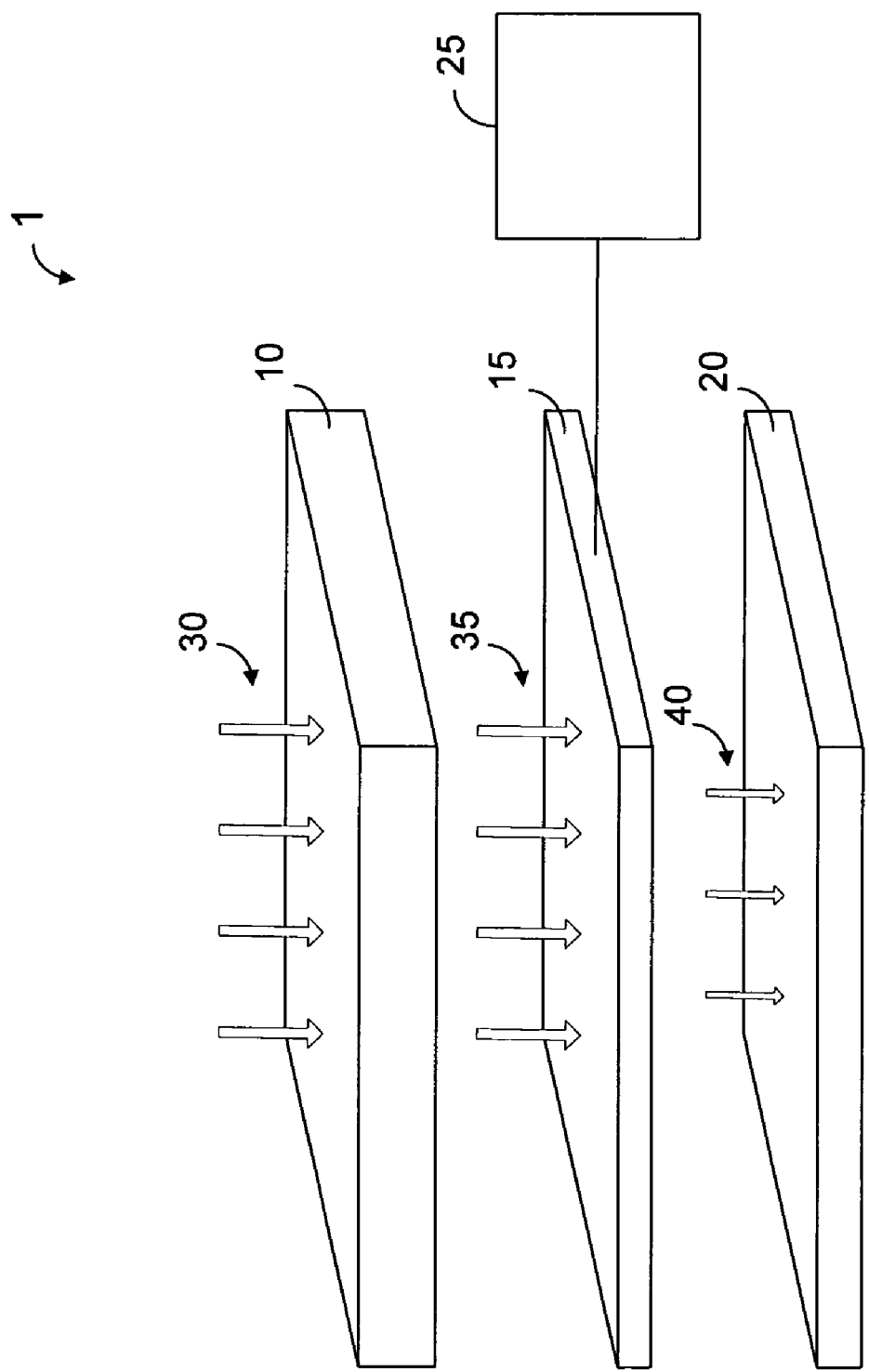
FIG. 1 is a side elevation of an apparatus according to some embodiments.

FIG. 1 is a side elevation of apparatus 1 according to some embodiments. Apparatus 1 may comprise an imaging device and includes scintillator 10, optical filter 15, imaging elements 20, and control 25. Optical filter 15 is disposed between scintillator 10 and imaging elements 20 and is coupled to control 25.

Scintillator 10 may comprise a scintillator screen for receiving input 30 and for emitting light 35 based on input 30. Input 30 may comprise any input based on which a currently- or hereafter-known scintillator may emit light 35. Examples of input 30 include but are not limited to X-rays, electron radiation, heat, pressure, and electrical charge. In a case that input 30 comprises X-rays, scintillator 10 may comprise a gadolinium-sulfide or cesium-iodide layer. According to some embodiments, scintillator 10 emits light 35 in proportion to an intensity of input 30.

Optical filter 15 may comprise any element or elements for controlling an amount of light 40 that passes to imaging elements 20. Such control may attempt to result in an amount of light 40 that falls within an optimal operating range of imaging elements 20, while avoiding saturation of any of imaging elements 20. In some embodiments, control 25 controls an opacity of optical filter 15 based on an expected amount of light 35.

Examples of optical filter 15 having a controllable opacity include any material having optical symmetry that may be modulated by one or more of magnetic fields, electric fields, mechanical stress, and other stimuli. Optical filter 15 may comprise two or more polarizing filters whose combined opacity may be controlled by mechanically rotating the transmission axis of one of the polarizing filters with respect to another one of the polarizing filters.

In some embodiments, optical filter 15 comprises a liquid crystal device configured to operate in accordance with the twisted nematic (TN) effect. Such an optical filter may generally comprise two crossed polarizing filters that are spaced several microns apart and filled with a TN liquid crystal material. Interior surfaces of the polarizing filters are coated with transparent electrodes and orientation layers. When no electric field is applied to such an optical filter by control 25, the orientation of the TN liquid crystal molecules is aligned with the crossed polarizing filters. As a result, incident light is linearly polarized by the reception-side polarizing filter, follows a ninety degree twist in the TN material, and nearly all of the polarized light exits the transmission-side polarizing filter. The opacity of such a filter may be increased by applying a few volts across the TN material using control 25 and the above-mentioned transparent electrodes.

According to some embodiments, control 25 controls an amount of light 40 by moving optical filter from the illustrated position between scintillator 10 and imaging elements 20 to another position that is not between scintillator 10 and imaging elements 20. Optical filter 15 used in conjunction with such embodiments may have a fixed or controllable opacity. According to some embodiments, optical filter 15 may comprise two or more optical filters each associated with a respective opacity. One or more of the optical filters may be selectively moved from a position between scintillator 10 and imaging elements 20 to another position that is not between scintillator 10 and imaging elements 20 to control a total opacity existing between scintillator 10 and imaging elements 20. Any two of the two or more optical filters may be associated with a same or an identical opacity.

Optical filter 15 may comprise any combination of one or more of the above-described embodiments.

Imaging elements 20 may comprise any one or more elements to capture image information based on light 40 received from optical filter 15. According to some embodiments, imaging elements 20 comprise an array of photodiodes, photoconductors, and/or charge-coupled devices that receive light 40, convert light 40 to electrical charge, and store the electrical charge. Imaging elements 20 comprise photographic film and/or other passive and/or active elements in some embodiments.

Some embodiments of apparatus 1 are designed to limit radiation damage to optical filter 15, to ensure uniformity of light transmission across filter 15, to optically match scintillator 10 and optical filter 15, and/or to reduce deterioration of spatial resolution that may result from the inclusion of optical filter 15 in the imaging chain.

Figure 2:
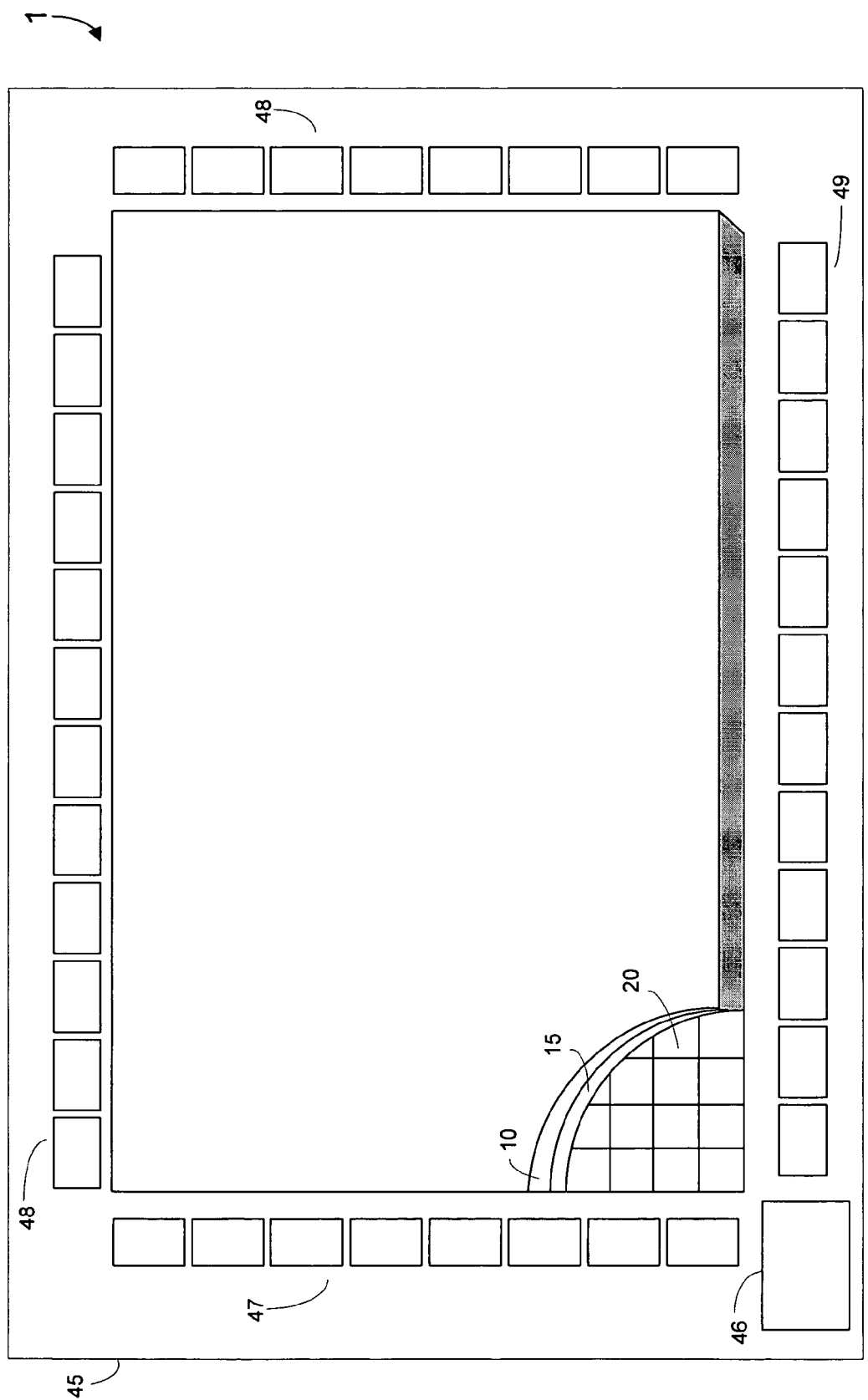
FIG. 2 is a cutaway top view of an apparatus according to some embodiments.

FIG. 2 is a cutaway top view of apparatus 1 according to some embodiments. Apparatus 1 of FIG. 2 is a flat-panel imaging device using solid-state amorphous silicon sensors deployed in a two-dimensional array. As shown, apparatus 1 consists of circuit board 45 on which various elements are mounted. One element is scintillator 10, a gadolinium-sulfide layer that absorbs X-rays and emits visible photons having an intensity proportional to that of the absorbed X-rays.

The cutaway portion of scintillator 10 shows optical filter 15, which may comprise any one or more optical filters as described above. In some embodiments, optical filter 15 is fixed within apparatus 1 of FIG. 2. Accordingly, an opacity of optical filter 15 is controlled using one or more of the techniques described above.

The cutaway portion also shows imaging elements 20. Imaging elements 20 of FIG. 2 comprise a matrix of amorphous silicon photodiodes and associated thin-film transistors. The matrix extends below the area of scintillator 10 shown in FIG. 2. In some embodiments, the matrix includes 1,048,576 photodiodes arranged in a 1024×1024 pixels array on 400 μm centers. The resulting photoactive region is approximately 41×41 $cm^2$.

Briefly, the photodiodes of imaging elements 20 absorb visible photons generated by scintillator 10 and transmitted by filter 15. The absorbed photons generate a current that is integrated into the photodiodes' self-capacitance as an electrical charge. The charge is read from the photodiode by applying a signal to a transistor associated with the photodiode. The read charge may be considered image information and used to construct an image.

Timing and control device 46 controls operation of apparatus 1 in accordance with process steps stored therein and commands received from remotely-connected devices. According to some embodiments, timing and control device 46 comprises control 25 described above. Device 46 may therefore control an opacity of optical filter 15. Device 46 may control optical filter 15 by applying a voltage thereto as described above. Such control may be in response to a desired opacity indicated by an external signal and/or based on an opacity determined by device 46.

In other examples, timing and control device 46 may control bias devices 47 to apply required bias voltages to the photodiodes of imaging elements 20. Timing and control device 46 may also control the application of signals to appropriate ones of line driver devices 48 to initiate reading the amount of charge, or image information, captured in one or more photodiodes of imaging elements 20. Data and signal amplification devices 49 are then controlled to receive and amplify the image information, which is thereafter multiplexed and converted to digital by timing and control device 46.

Commands and data can be transmitted to and from apparatus 1 via I/O lines (not shown). Moreover, the elements of apparatus 1 shown in FIG. 2 may be encased in a suitable protective housing.

Figure 3:
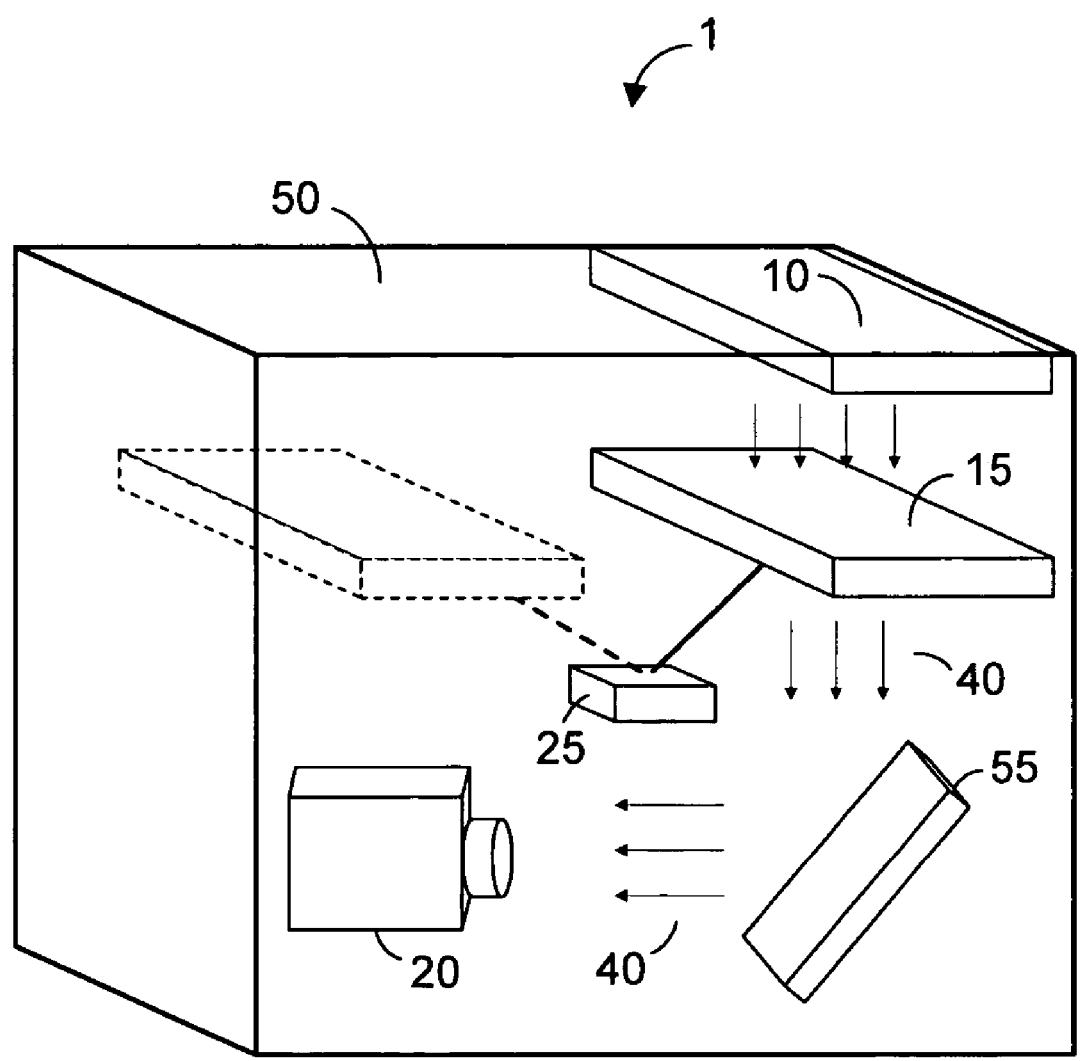
FIG. 3 is a block diagram of an apparatus according to some embodiments.

FIG. 3 is a diagram illustrating elements of apparatus 1 according to some embodiments. Apparatus 1 comprises light-proof housing 50, which in turn comprises scintillator 10, optical filter 15, imaging elements 20, control 25, and mirror 55. Apparatus 1 of FIG. 3 may include more elements than those illustrated.

Scintillator 10 and optical filter 15 may comprise any scintillator or optical filter described above. Imaging elements 20 may comprise an array of charge-coupled devices or a vacuum tube disposed in a camera. Control 25 may operate to move optical filter 15 from a first position (indicated by solid lines) between scintillator 10 and imaging elements 20 to a second position (indicated by dashed lines) not between scintillator 10 and imaging elements 20. The term "between" is used herein as equivalent to "in the optical path between". Control 25 may operate in response to an external command to move optical filter 15 or may determine to move optical filter 15 based on other information.

Mirror 55 is disposed to direct light 40 from optical filter 15 to imaging elements 20. Mirror 55 may be used to reduce a physical size of housing 50. In this regard, the physical dimensions of depicted elements and the spatial relationships of the elements to one another are not limited to the dimensions and relationships shown in the present figures.

Figure 4:
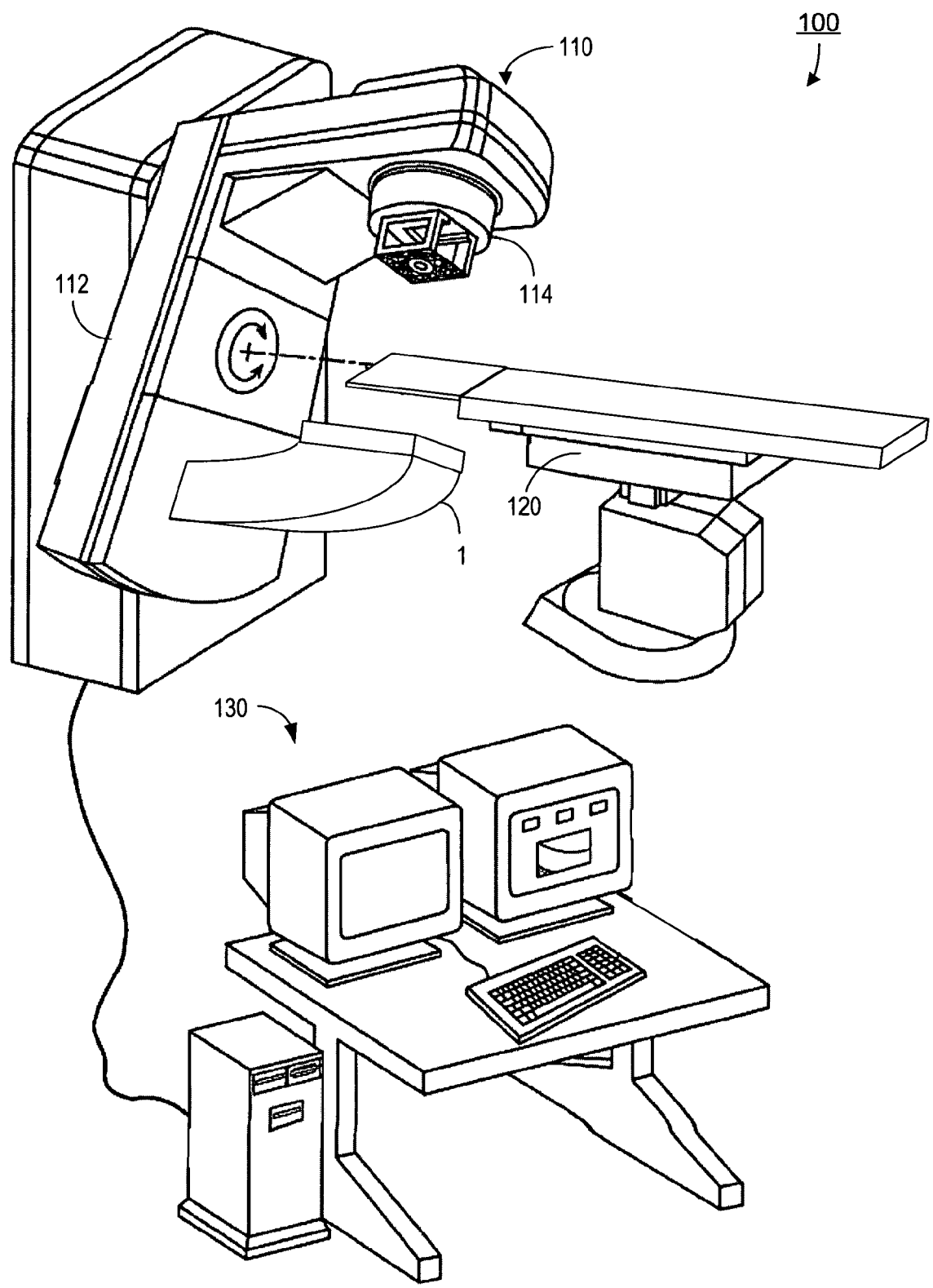
FIG. 4 is diagram illustrating a radiation treatment room according to some embodiments.

FIG. 4 illustrates radiation therapy room 100 pursuant to some embodiments. Radiation therapy room 100 includes linear accelerator (linac) 110, treatment table 120, operator station 130, and apparatus 1 according to some embodiments. The elements of radiation therapy room 100 may be used to deliver radiation to a patient according to a radiation treatment plan.

Linac 110 delivers radiation by rotating gantry 112 to an appropriate position and emitting photon or electron radiation from treatment head 114. The radiation may be delivered to a treatment area of a patient supported by table 120. Table 120 may be adjustable in order to place the treatment area in the path of the emitted radiation.

Apparatus 1 according to the illustrated embodiment is used to perform portal imaging for radiation therapy treatments. More particularly, apparatus 1 may be used to acquire images of an internal portion of a patient for verification and recordation of a treatment field. These images can be acquired before or after treatment to ascertain that the patient position conforms to a desired treatment plan. Apparatus 1 may also capture images for verifying radiation beam shape and/or radiation dosage.

The foregoing imaging tasks may present different imaging parameters to apparatus 1. Beam shape verification may use low amounts of radiation which cause scintillator 10 to emit low amounts of light, while dose verification and/or patient portal verification may result in large amounts of radiation being absorbed by and large amounts of light being emitted from scintillator 10.

Operator station 130 is typically operated by an operator who administers actual delivery of radiation treatment as prescribed by an oncologist. The operator may input data defining a radiation dose to be delivered to the patient, for example, according to the prescription of the oncologist.

Operator station 130 may include a hardware card (not shown) according to some embodiments. The hardware card may include hardware elements such as integrated circuits, discrete devices, or the like and may also incorporate software such as process steps stored in a programmable memory device. Specifically, such a hardware card may include hardware elements to determine a radiation dose, and to control an amount of light to be received by imaging elements of apparatus 1 based on the determined dose. In some embodiments, controlling the amount of light includes control of the opacity of optical filter 15 disposed between scintillator 10 and imaging elements 20 of apparatus 1. Controlling the amount of light according to some embodiments includes moving optical filter 15 to a position between scintillator 10 and imaging elements 20.

Such a hardware card may also be installed within linac 10, apparatus 1, or another device in direct or indirect communication with apparatus 1.

Figure 5:
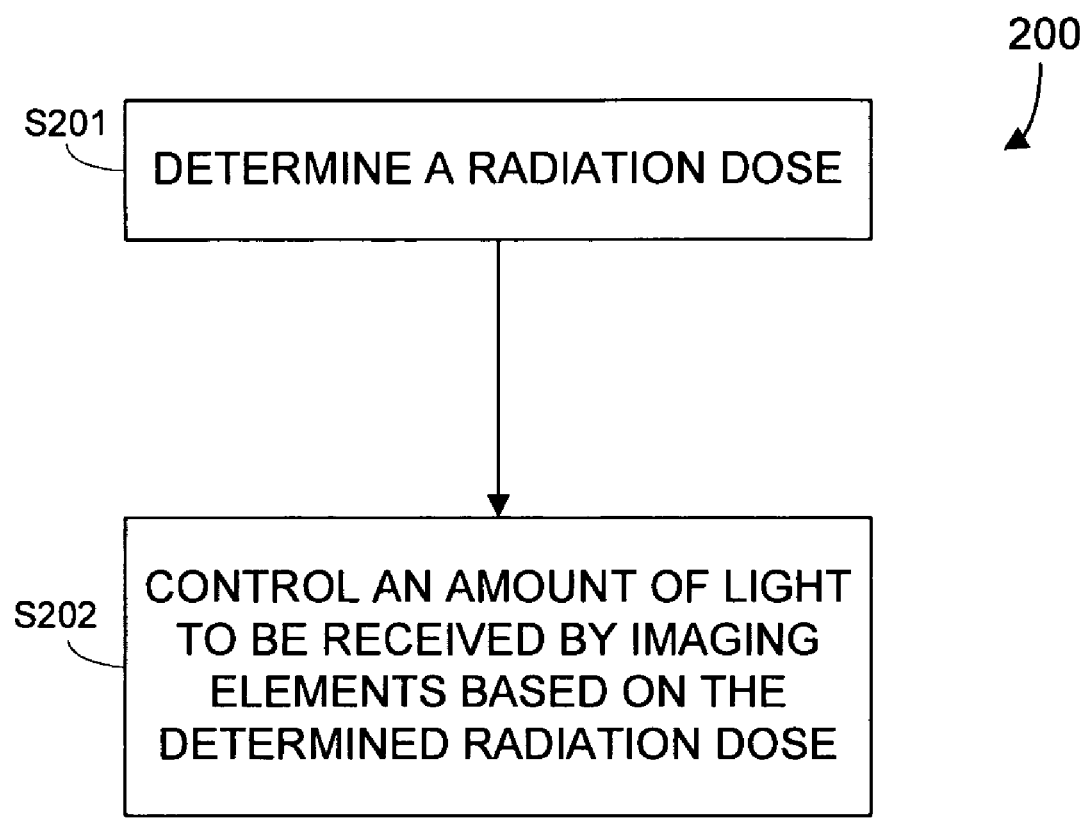
FIG. 5 is a flow diagram of a process according to some embodiments.

FIG. 5 is a flow diagram of process steps 200 according to some embodiments. Process steps 200 may be embodied in hardware installed within operator station 130, linac 110, apparatus 1, and/or another device in direct or indirect communication with apparatus 1. Process steps 200 may also be embodied, in whole or in part, by software executed by devices including but not limited to operator station 130, linac 110, and/or apparatus 1. Moreover, process steps 200 may be embodied by a standalone device connected between linac 110 and operator station 130, between linac 110 and apparatus 1, or elsewhere.

Briefly, process steps 200 comprise steps to determine a radiation dose, and to control an amount of light to be received by imaging elements based on the determined dose. Process steps 200 begin at step S201, wherein a radiation dose is determined. Determination of the radiation dose may include determining an amount of radiation to be delivered to apparatus 1. Such a determination may account for a radiation plan to be executed by delivery of the radiation, permittivities of materials that will lie between treatment head 114 and apparatus 1 during radiation delivery, actual amounts of radiation to be delivered by treatment head 114, an intensity of the radiation to be delivered, a shape of a field over which the radiation is to be delivered, and a duration of radiation delivery.

Next, at S202, an amount of light to be received by imaging elements 20 is controlled based on the determined radiation dose. The amount of light may be controlled such that the amount of light corresponds to a preferred operating range of apparatus 1. Step S202 may include determining an amount of light to be emitted by scintillator 10 in response to the radiation dose determined in step S201. The determined amount of light can then be compared with a preferred operating range of apparatus 1 to determine how (and/or whether) the light from scintillator 10 should be filtered before it reaches imaging elements 20.

The amount of light to be received by elements 20 may be controlled by changing the opacity of optical filter 15 as described above. In some embodiments, the amount of light may be controlled by moving an optical filter from a first position between scintillator 10 and imaging elements 20 to a second position not between scintillator 10 and imaging elements 20.

Those in the art will appreciate that various adaptations and modifications of the above-described embodiments can be configured without departing from the scope and spirit of the claimed invention. Also, embodiments of the claimed invention may differ from the descriptions above.

What is claimed is:

1. An apparatus comprising:
   a scintillator to emit light;
   imaging elements to capture image information based on received light;
   a first optical filter controllably movable from a first position between the scintillator and the imaging elements to a second position not between the scintillator and the imaging elements; and
   a second optical filter controllably movable from a third position between the scintillator and the imaging elements to a fourth position not between the scintillator and the imaging elements.

2. An apparatus according to claim 1, wherein the imaging elements comprise a plurality of charge-coupled devices.

3. An apparatus according to claim 1, wherein to imaging elements comprise a plurality of photodiodes.

4. An apparatus according to claim 1, wherein an opacity of the first optical filter is controllable.

5. An apparatus according to claim 4, further comprising: a control to control an opacity of the first optical filter.

6. An apparatus according to claim 1, further comprising: a control to move the first optical filter from the first position to the second position, and to move the second optical filter from the third position to the fourth position.

7. An apparatus according to claim 1, the scintillator to receive X-rays and to emit light based on the received X-rays.

8. An apparatus according to claim 7, the first optical filter to receive at least a portion of light emitted by the scintillator in a case that the optical filter is located at the first position.

9. An apparatus according to claim 1, further comprising: a linear accelerator to emit X-rays.

10. An apparatus according to claim 1, further comprising:
a device to determine a radiation dose to be received by the scintillator, determine an expected amount of light to be emitted from the scintillator based at least on the determined radiation dose, and control the first optical filter and the second optical filter based at least on the expected amount of light.

11. A method comprising:
determining a radiation dose to be received by a scintillator;
determining an expected amount of light to be emitted from the scintillator based at least on the determined radiation dose; and
controlling a first optical filter and a second optical filter based at least on the expected amount of light,
wherein the first optical filter is movable from a first position between the scintillator and imaging elements to a second position not between the scintillator and the imaging elements, and
wherein the second optical filter is movable from a third position between the scintillator and the imaging elements to a fourth position not between the scintillator and the imaging elements.

12. A method according to claim 11, wherein controlling the first optical filter and the second optical filter comprises:
moving the first optical filter to the first position.

13. A method according to claim 11, wherein controlling the first optical filter and the second optical filter comprises:
moving the second optical filter to the third position.

14. A method according to claim 13, wherein controlling the first optical filter and the second optical filter comprises:
moving the first optical filter to the first position.

15. A computer-readable medium storing processor-executable process steps, the process steps comprising:
a step to determine a radiation dose to be received by a scintillator;
a step to determine an expected amount of light to be emitted from the scintillator based at least on the determined radiation dose; and
a step to control a first optical filter and a second optical filter based at least on the expected amount of light,
wherein the first optical filter is movable from a first position between the scintillator and imaging elements to a second position not between the scintillator and the imaging elements, and
wherein the second optical filter is movable from a third position between the scintillator and the imaging elements to a fourth position not between the scintillator and the imaging elements.

16. A medium according to claim 15, wherein the step to control the first optical filter and the second optical filter comprises:
a step to move the first optical filter to the first position.

17. A medium according to claim 15, wherein the step to control the first optical filter and the second optical filter comprises:
a step to move the second optical filter to the third position.

18. A medium according to claim 17, wherein the step to control the first optical filter and the second optical filter comprises:
a step to move the first optical filter to the first position.

* * * * *